UNITED STATES PATENT OFFICE.

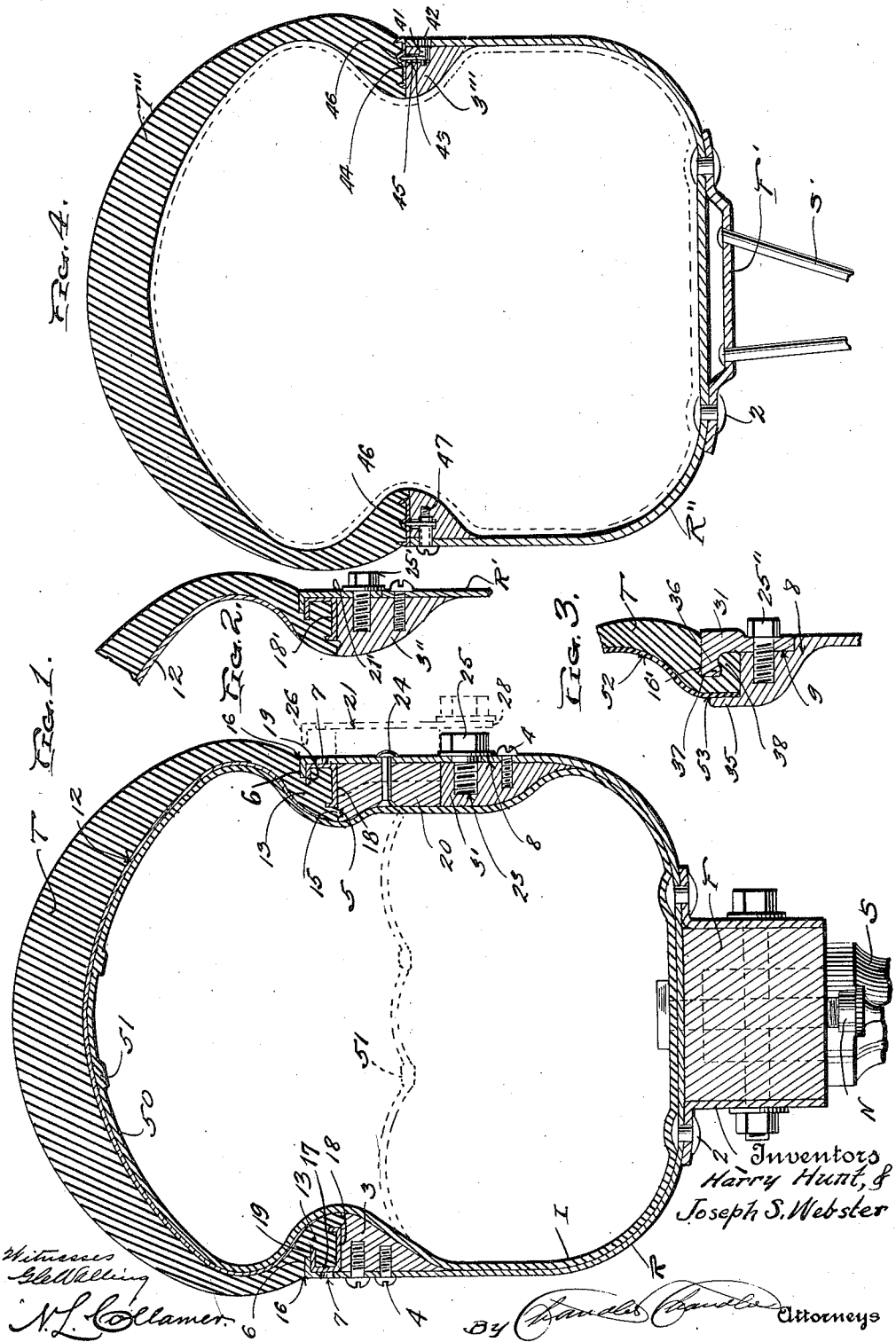

JOSEPH S. WEBSTER AND HARRY HUNT, OF SEATTLE, WASHINGTON.

COMBINED WHEEL AND TIRE.

1,418,854.  Specification of Letters Patent.  Patented June 6, 1922.

Application filed January 5, 1920. Serial No. 349,579.

*To all whom it may concern:*

Be it known that we, JOSEPH S. WEBSTER and HARRY HUNT, citizens of the United States, residing at Seattle, county of King, State of Washington, have invented certain new and useful Improvements in Combined Wheels and Tires; and we hereby declare the following to be a full, clear, and exact description of the invention, such as will enable others skilled in the art to which it appertains to make and use the same.

This invention relates to tires, and more particularly to pneumatic tires; the objects of the invention are, first, to so construct the air chamber that only such portion of same as is required for cushion, tread and joints is made of rubber, the inner part of the casing being made of metal and formed as an extension of the rim of the wheel, or so as to be mounted thereon; second, means for changing either the rubber tread or the inner tube without disturbing the other member; third, means for protecting the inner tube from puncture and abrasion; fourth, blending the material of tread to secure greater pliability at the thin portion of the sides and a lower grade at the joints and tread.

As at present made, the casings of pneumatic tires wear out almost wholly across the tread or crack at the thin sides, resulting in being discarded when a large portion of the casing is still good. While we largely reduce the volume of elastic material employed in the casing, we do not reduce the volume of the air chamber, and this may be made of any desirable volume without materially changing the amount of rubber in the cushion and tread portion of the enclosure.

Another item of economy is the provision of a tough, but elastic lining inside the tread only to receive any thrust of foreign matter and recede ahead of its point and thereby protect the inner tube from puncture.

In our construction the ordinary devices which fasten the casing to the rim of the wheel are done away with, or in other words they are replaced by means for connecting the two parts of the casing together, and the provision of an annular opening through which an inner tube may be removed and another inserted. These connecting means are also such that when unfastened the joints at sides of the tread can be indented at one side or moved at one or both sides axially of the wheel so that its edge or edges no longer aline with the edges of the inner rigid part, and then the inner member or air tube can be drawn out and repaired and reinserted.

Another object of the invention is to provide, with a casing of this kind, an inner tube which when deflated will automatically collapse so that it lies wholly within the inner part of the casing, thus permitting the movement of the outer part as just explained.

Other objects and features of the invention will be set forth in the following detail explanation and shown in the drawings in several embodiments of the idea. Referring to such drawings:

Figure 1 is a cross section through the felly of the wheel and the complete tire of this invention, the casing being shown in one of its forms and the inner tube as deflated, and this view illustrates in dotted lines how the key may be removed.

Figure 2 is a sectional detail through the right side of the casing of another type of the invention omitting the filler.

Figure 3 is a sectional detail of another type of the invention, illustrating also a slightly modified construction of the inner member.

Figure 4 is a section through the tire complete and the felly and spokes, showing yet another type of the invention and illustrating the fact that it might be mounted on a different felly.

The felly F and spokes S of Figure 1 are of wood, while the felly F' and spokes S' of Figure 4 are of metal. No novelty is claimed for either. Mounted around the felly is a channeled metal rim R which constitutes the inner part and probably about the inner half of the casing or shoe, the outer part or half constituting the tread T and being of laminated rubber and friction canvas or other well known construction employed in the tread side of tire casings of the present day. The inner member or pneumatic tube I will doubtless be entirely of rubber having the usual air tube or nipple N.

Coming now to the present invention, the rim R is attached to the felly F by any suitable means such as angle irons 1 and rivets 2, and is bent into substantially U-shape with its edges thickened or beaded internally by integral or perhaps separate elements 3 which, if separate, are fastened thereto by screws or other members 4 and may also be welded. The radially outer edges of this which is the inner half or part of the casing are preferably flat, and they may have longitudinal grooves 5 referred to below. At what will be that side of the tire next the machine, or the inner side of the wheel, the metal of the rim is carried past the bead 3 and turned or flanged inward at its edge into a lip 6, and at intervals this portion of the metal beyond the bead is pierced with holes 7 for a purpose yet to appear. The metal of the rim at the other side terminates in a shoulder 8. The outer part or half of the casing is composed mainly of the rubber tread T whose general shape is that of the outer side of an ordinary tire casing, or in other words it conforms in contour and preferably in size with the radially outer half of a rubber shoe excepting that it is thickened or beaded at its edges as at 13, and said edges are preferably flat where they meet the edges of the rim, excepting that they may be provided with small tongues 15 to engage the grooves 5, thereby making a very neat joint between the mating edges and excluding dust and moisture. Within each edge of this outer part is embedded a metal reenforce which may be of about the cross section seen in Figures 1 and 2, its base plate 18 being flush with the face of the edge of the tread and its upright plate 17 flush with the outer face of the tread and normally extending across said holes 7 for a purpose yet to appear. These plates may have inturned flanges at their edges as seen, and the radially outer flange 19 underlies and forms the bottom of a channel 16 in the outer side of the tread T, which channel is adapted to closely receive said lip 6 when the parts are assembled as seen at the left of Figure 1. Internally the tread may have a lining 12 cemented or otherwise secured in place.

At the other side of the tire, which will be at the outside of the wheel remote from the body, the construction follows that shown at the right of Figure 1. The bead 3' here projects beyond the edge of the rim R that produces the shoulder 8 referred to, and in Figure 1 a filler 20 is employed which is of a size to occupy the space between the face of the bead and the inner edge of the tread. To the outer face of this filler by rivets 24 or otherwise is attached a key 21 which consists of a metal strip extending at its outer edge beyond the outer edge of the filler and bent inward into a flange constituting a lip 26 for engagement with the channel 16 at this side of the tread. At its inner edge the key projects also beyond the filler as at 28 so as to contact with the shoulder 8, and key fastening means such as screws 25 pass through this portion 28 of the key and into sockets 23 in the bead 3'. This edge of the tread has the same reenforce 14 reversed, and its flange 19 forms the base of the channel 16 for receiving the lip 26. Obviously when the screws 25 are tightened up the key is clamped against the outer face of the bead 3' with its edge against the shoulder 8, and its lip is forced into the channel 16, and at this time the filler occupies the space between the edges of the tread and rim. When the screw fasteners 25 are withdrawn and the key 21 and its filler 20 entirely removed as seen in dotted lines in Figure 1, a space is provided through which the deflated inner tube I may be inserted or removed without necessarily removing the tread.

The type of the invention illustrated in Figure 2 so closely follows that just described that a duplication of the description is hardly necessary. In this embodiment of the invention the side R' of the rim is carried farther outward than in Figure 1, so that the bead 3'' contacts at its outer edge with the inner edge of the tread and the base plate 18' of the reenforce thereof. Substantially the same key 21' is employed, and its fastening screws 25' pass through it into sockets in the bead. In a word, this type is the same as Figure 1 with the omission of the filler. It can be used where the outer member of the case is so light or flexible that it may be sprung or deflected sufficiently to gain access to the inner tube I, without the necessity for removing an annular filler such as shown at 20 in Figure 1.

The type of the invention illustrated in Figure 3 is somewhat similar, and this means connecting the inner and outer parts of the casing may well be employed at both sides of the tire. The bead is integral and has the shoulder and rabbet on its outer face and preferably also a lip or tongue 35 projecting radially from its inner face. The key 31 has a lip 36 entering a channel 16' in the outside of the tread T, but the reenforce is absent and the lip may be hooked a little at its tip as shown at 37, while the underlying edge 38 of the tread will be hooked to correspond, and the hooks held in mutual engagement between said tongue 35 and the key 31. The fastener 25'' may well be the same as that shown in Figure 2 engaging a socket within the bead.

The type of the invention shown in Figure 4 illustrates the same as applied to a wheel having metal spokes and felly, although this is a matter of economy in drawings because the other types could be applied to a metal wheel or this type to a wooden wheel. Also this view has been made use of to show slight modifications of this embodiment of the invention at the two sides of the tire. The rim R'' has beads 3'' at its edges much like those shown in Figure 2, and the tread T'' has flat faces abutting those of the beads and reenforced by plates 44 inset into them, the plates themselves having channels 46 opening out through said faces. The key at the right side of Figure 4 is a rotary plug 41 squared at its outer end as at 42 for the reception of a wrench and having a lip or finger 43 at its inner end adapted to be thrown into the channel as the plug is rotated, the finger moving within a passage 45 cut in the bead to permit. The key shown at the left of Figure 4 is a screw 47 whose head is exposed beyond the metal rim R'' and whose nick may receive a screw driver, and the inner end of this screw carries a similar lip or finger adapted to be moved into the channel 46 by partial rotation of the screw.

Reverting to Figure 1 of the drawings, the pneumatic inner tube I will ordinarily be an air tube whose body 50 may follow the construction of those now commonly employed and will be of sufficient size to completely fill the tire when it is inflated; but around the outer periphery of this body we form or attach one or more bands 51 of rubber or other contractile material (perhaps by thickening and shrinking the material of the tube itself) but which band or bands in their normal contracted condition must be so small that, when the tube is deflated, they will collapse or contract it automatically. The result is that the deflated tube I assumes the position seen in dotted lines in Figure 1, or in other words when air is let out of the tube it collapses into the inner part of the tire so that the outer part can be indented to reach in for the tube, or may in fact be entirely removed from the inner part by a movement axially of the wheel. From this suggestion it may be gathered that at times the outer or rubber part of the tire is disconnected from the metal or inner part, as for cleaning or repair, or when the tread has become worn and must be replaced. To so disconnect, a pin is passed inward through the hole 7 and a light tap on its outer end will drive the upright plate 17 of the reenforce 14 out from under the hook 6 in case it shall have become stuck thereto. These holes 7 may be also in the keys if desired, but ordinarily when the fastener 25 is withdrawn the key can be removed with ease. Thus both edges of the tread are freed from the rim, and the tread as a whole can be slipped axially off of the rim, in doing which of course it is advisable to have the tube collapsed within the rim. The inner member shown in Figure 3 is only half a tube, the inner side thereof being entirely omitted, and obviously the nipple will then admit air to the interior of the rim R, which now makes clear why it is preferred to weld the beads to this rim and perhaps to solder or weld the inner ends of the rivets 2 so as to prevent the leakage of air. The inner member is, then, a sheet or strip 52 of rubber whose edges 53 are clamped between the tongue 35 of the bead and the edge of the tread as said edge is borne inward by fastening the key 31 in place, and the body of this inner member extends from one edge around the interior of the tread to the other edge, said body possibly also carrying the band or bands 51 for collapsing it when air is exhausted. On the other hand, air pressure in the tire, admitted directly to the interior of the rim, would expand this half tube or sheet 52 into close contact with the inner face of the tread T affording the latter the resiliency required and saving half the cost of an ordinary inner tube. Repairs are made to this type of inner member the same as to a complete pneumatic tube, by first deflating the tire so that the sheet 52 contacts within the rim, then detaching one or preferably both the keys 31, and disconnecting one or both edges of the tire from the rim so that access to the pneumatic member may be had.

What is claimed is:

1. In a tire, the combination with a casing comprising radially inner and outer parts meeting edge to edge, and removable means lapping the mating edges for fastening said parts together and permitting the outer part to be moved axially off the inner when unfastened; of an inner cushion member, means for distending it into said outer part under air pressure and means for contracting it within the inner part when the pressure is decreased.

2. In a pneumatic tire, the combination with a casing comprising radially inner and outer parts separable by movement of the outer axially off of the inner, and means for connecting said parts edge to edge; of an inner tube, and means around its periphery for automatically contracting it into said inner part when deflated.

3. In a pneumatic tire, the combination with a casing comprising outer and inner parts connected at one side and meeting edge to edge at the other side, and external removable fastening devices for connecting said edges; of a pneumatic inner tube of a size to fill both parts when inflated, and contractile bands around its outer periphery for automatically collapsing it into the inner part when deflated.

4. In a pneumatic tire, the combination with a casing comprising outer and inner parts connected at one side, and a removable fastening key lapping and adapted to connect their edges at the other side; of a pneumatic inner tube adapted when deflated to contract to a condition where it is wholly enclosed within the inner part so that the edge of the outer part when unfastened may be borne into the casing to give access to the tube.

5. The herein described tire casing made up of rigid and flexible parts whose edges have beads on their inner sides meeting face to face, a metal reenforce inset into the face of the flexible part, and a metal key movably carried by the mating bead of the rigid part and accessible from its exterior, the key having a lip adapted to engage said reenforce.

6. The herein described tire casing made up of an outer tread part of rubber, a channeled inner part of metal, the edges of said parts alining with each other at opposite sides, means for connecting said edges face to face at one side, a filler between the faces of the edges at the other side, and means accessible from the exterior of the casing for detachably connecting the filler with both said edges.

7. The herein described tire casing made up of an outer tread part, a channeled inner part, the edges of said parts alining with each other at opposite sides, means for connecting said edges face to face at one side, a filler between the faces of the edges at the other side, a key secured to the outer side of the filler and extending beyond both its faces and having means at its outer edge for engaging said tread, and detachable fastening means passing through its projecting inner edge into said inner part.

8. In a tire, the combination with a casing whose radially outer part is flexible and its inner part rigid and formed by an extension of the metal rim of a wheel, of means for connecting the parts edge to edge at one side, their edges being spaced and beaded at the other side, a metal reinforce inserted into each edge of the flexible part, said flexible part having a channel in its outer face outwardly beyond the reinforce, a filler removably positioned to occupy the space between said edges, a key carried by the filler and having a lip detachably engaging said channel and means for detachably mounting the key on the beaded edge of the rigid part.

In testimony whereof, we affix our signatures, in the presence of witnesses.

JOSEPH S. WEBSTER.
HARRY HUNT.

Witnesses for Webster:
   E. H. HUESTIS,
   P. E. WELDY.
Witnesses for Hunt:
   SYLVIA M. LEROUX,
   H. D. FOLSOM, Jr.